Nov. 24, 1931.    G. SABIK ET AL    1,833,181
DUPLICATING MACHINE
Filed Aug. 10, 1929    9 Sheets-Sheet 2

Nov. 24, 1931. G. SABIK ET AL 1,833,181
DUPLICATING MACHINE
Filed Aug. 10, 1929    9 Sheets-Sheet 7

Inventors
George Sabik
Samuel Offer
By Samuel W. Banning
Atty.

Nov. 24, 1931.　　G. SABIK ET AL　　1,833,181
DUPLICATING MACHINE
Filed Aug. 10, 1929　　9 Sheets-Sheet 8

Witness
William P. Kilroy

Inventors
George Sabik
Samuel Offer
By Samuel W. Banning　Atty.

Nov. 24, 1931.  G. SABIK ET AL  1,833,181
DUPLICATING MACHINE
Filed Aug. 10, 1929   9 Sheets-Sheet 9
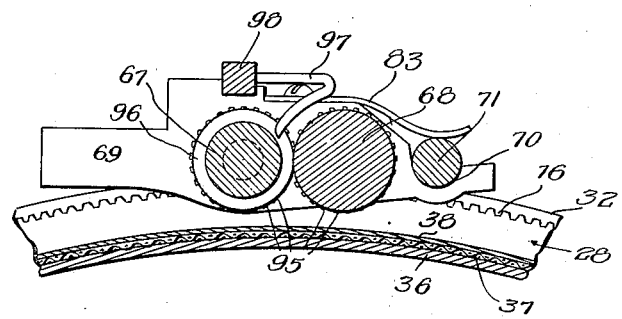
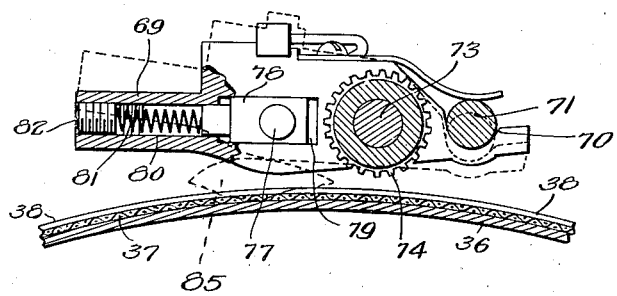
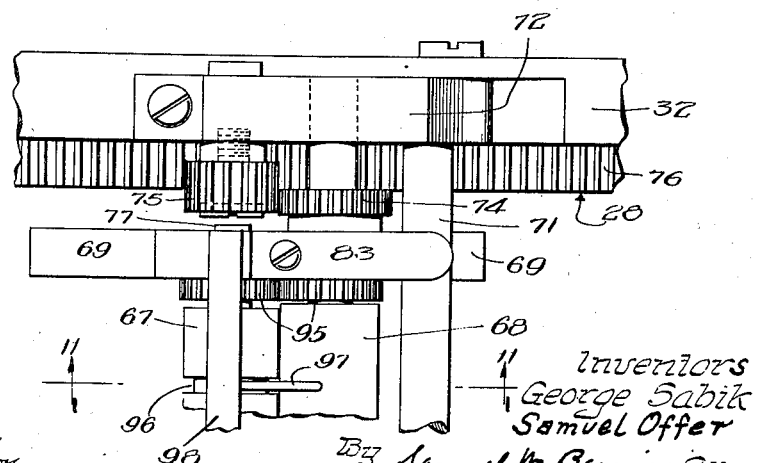

Patented Nov. 24, 1931

1,833,181

UNITED STATES PATENT OFFICE

GEORGE SABIK, OF WESTERN SPRINGS, AND SAMUEL OFFER, OF CHICAGO, ILLINOIS, ASSIGNORS TO U. S. DUPLICATOR COMPANY, OF CHICAGO, ILLINOIS, A CORPORATION OF ILLINOIS

DUPLICATING MACHINE

Application filed August 10, 1929. Serial No. 384,871.

The machine of the present invention is intended as an improvement and development of the duplicating machine set forth and described in the patent of George Sabik, No. 1,749,160, issued March 4, 1930.

The present machine is provided with means for evenly and uniformly feeding and spreading the paper sheets on the surface of the gelatine and thereafter stripping and delivering the imprinted sheets by the action of associated presser and stripper mechanisms both carried on a continuously rotating carrier, so that the machine as a whole may be operated by power at a relatively high speed.

In the present machine, the presser device is so co-ordinated with the feeding means that the paper sheets will be initially fed to position adjacent the end of the gelatine band and looped forwardedly into adherent contact with the gelatine before the arrival of the presser, so that the engagement of the paper sheet by the advancing presser, and the final drawing out and pressing down of the paper sheet will not disturb the accurate register of the sheet effected by the initial feeding.

The stripper advances after the presser, and co-operates with means for lifting and positively directing the edge of the paper sheet into the bite of the stripper rolls, so that the imprinted sheets will be evenly stripped and fed back to a rack, from which they are delivered.

The invention therefore relates to the means for mounting and co-ordinating the action of the presser and stripper mechanisms, and to the means for operating the feeding device in harmonized timed relation to the presser device; to the means for imparting positive rotation to the stripper rolls, the arrangement of the paper stop mechanism in harmonized relation to the feeding and presser device; to the driving means; to the means for feeding and locking the gelatine band; and to the general construction and arrangement of the machine as a whole.

In the drawings:

Figs. 11, 12 and 13 are details of the stripper mechanism.

Figure 6:
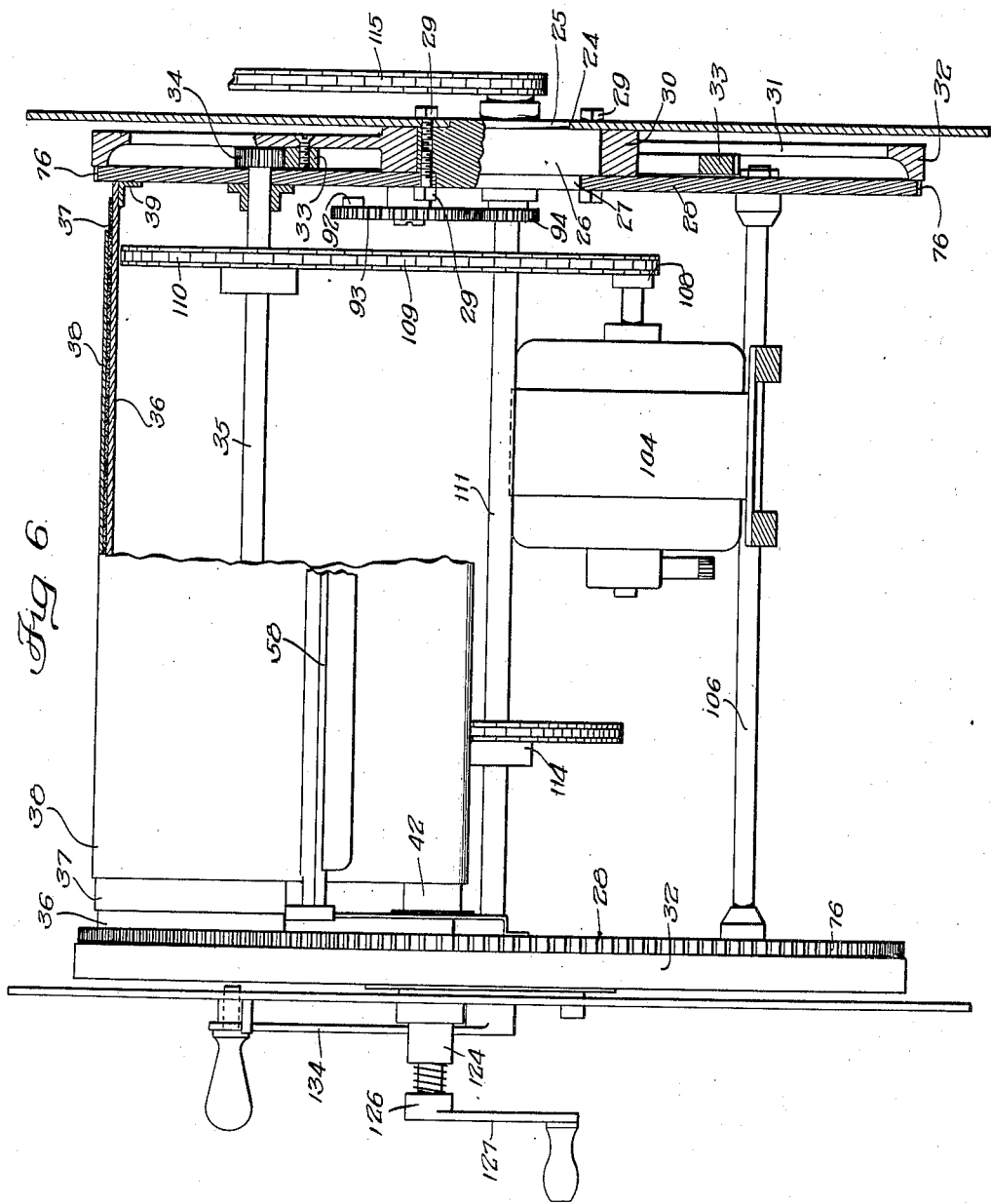
Fig. 6 is a view partly in cross section, showing the driving train.

The machine is mounted within a frame comprising side plates 20 of circular formation, which are provided with forward extensions 21 for mounting the paper feeding mechanisms. The side plates rest upon legs 22 which are connected by tie rods 23. Each of the side plates of the frame is provided with a central aperture 24 which receives a circular boss 25 outwardly projecting from a bearing block 26 provided with a boss 27 on its inner face. The bearing block serves as a spacer for inner circular side plates 28, the inner and outer plates being secured to the bearing block 26 by bolts 29, as shown in Fig. 6.

Each of the bearing blocks serves as a mounting for the hub 30 of a wheel-shaped rotating carrier provided with spokes 31 and a rim 32. The rotating carrier is provided with a circular rack 33 meshing with a pinion 34 on a shaft 35, the arrangement being the same at each end of the shaft, so that as the shaft is rotated the carrier will rotate within the space between the inner and outer fixed plates.

Between the fixed inner plates, around the upper portion of the machine, extends a circularly curved bed plate 36 provided with a felt pad 37 upon which rests the gelatine band 38. The edges of the bed plate are supported upon curved angle brackets 39, and it will be noted from Figs. 7 and 9 that the curved bed plate extends through an arc of about 120°.

The ends of the gelatine band pass over guide rolls 40 and 41, and are wound around spindles 42, either of which may constitute the winding spindle or the delivery spindle, so that sections of the gelatine band may be fed across the curved surface of the bed plate from time to time as desired. As shown, one side of each of the spindles is flattened and provided with headed buttons 42$^a$ adapted to hook through buttonholes 42$^b$ in the binding strip at the end of the gelatine band.

Figure 5:
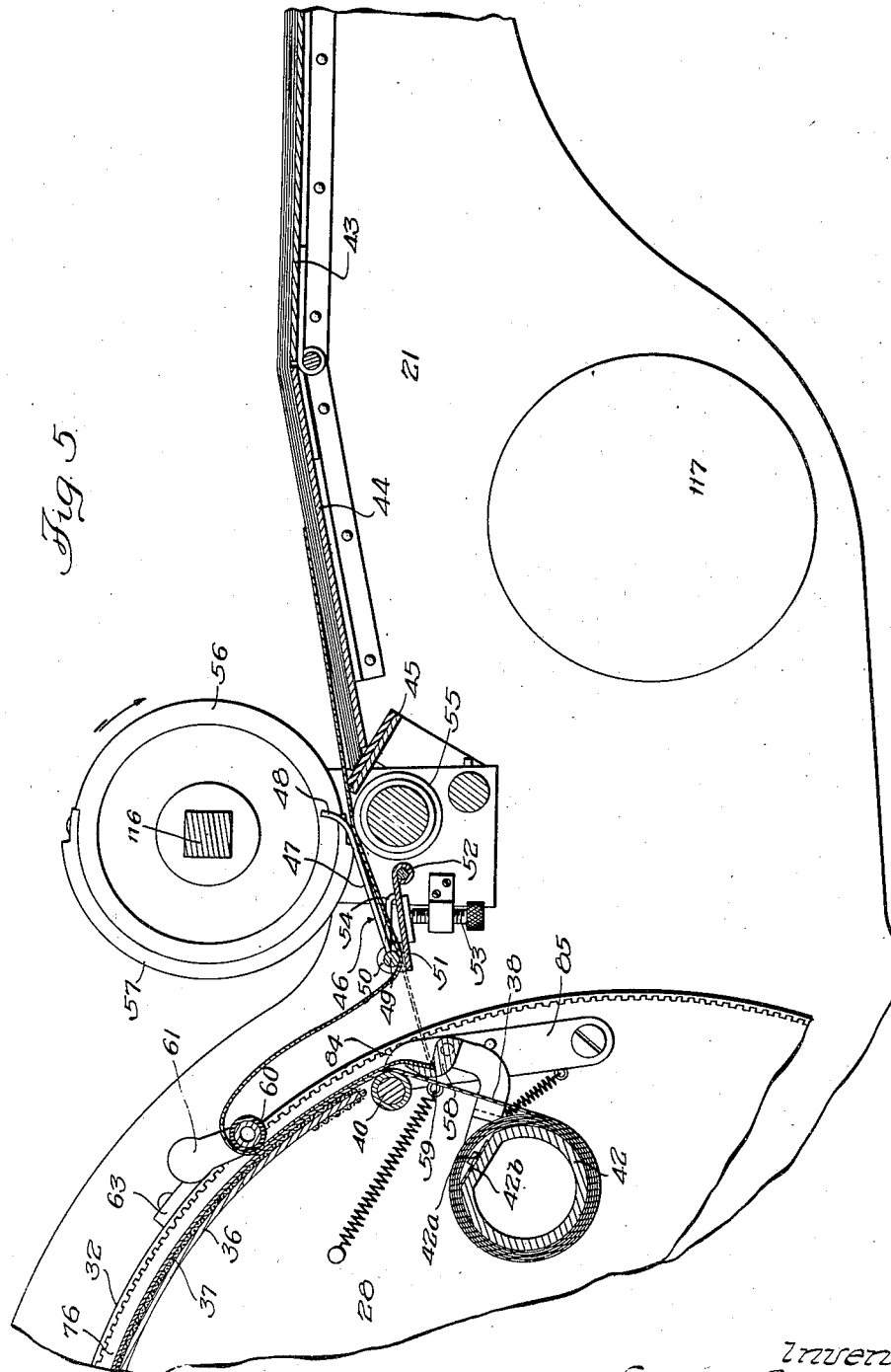
Fig. 5 is an enlarged sectional detail of the paper feeding and paper stop mechanisms.

The paper is fed forwardly from a feeding surface, comprising a rear level plate 43 and a forward obliquely disposed plate 44, which feeding surface serves to support a stack of paper sheets, the forward edges of which lie in abutting relation to a rubber surfaced obliquely disposed stop plate 45, as shown in Fig. 5. The obliquity of the stop plate with relation to the paper feeding surface causes the forward edges of the paper sheets to lie in progressively advanced relation, and the friction of the rubber surface prevents the under sheets from being displaced as the upper sheet is manually presented to the feeding devices which carry the sheet forwardly into the machine.

In order to hold the forward edge of each paper sheet in proper position, a comb-like guide member 46 is provided, which consists of a plurality of prongs 47 upturned at their rear ends 48 and secured at their forward ends to a rotatable rod 49 journalled between ears 50 upstanding from the ends of a plate 51 which is hinged upon a cross rod 52, and adjustable by means of an adjusting screw 53.

At each end of the rod 49 is a stop finger 54 which bears against the plate 51 and serves to hold the rear ends of the prongs in slightly elevated relation above the surface of a lower feeding roller 55 which coacts with an upper feed wheel 56 provided throughout a portion of its surface with a rubber shoe 57 so disposed that it will exert pressure against the lower roll 55 to carry forward the sheet of paper lying between the guide prongs 48 and the lower roll 55.

Figure 1:
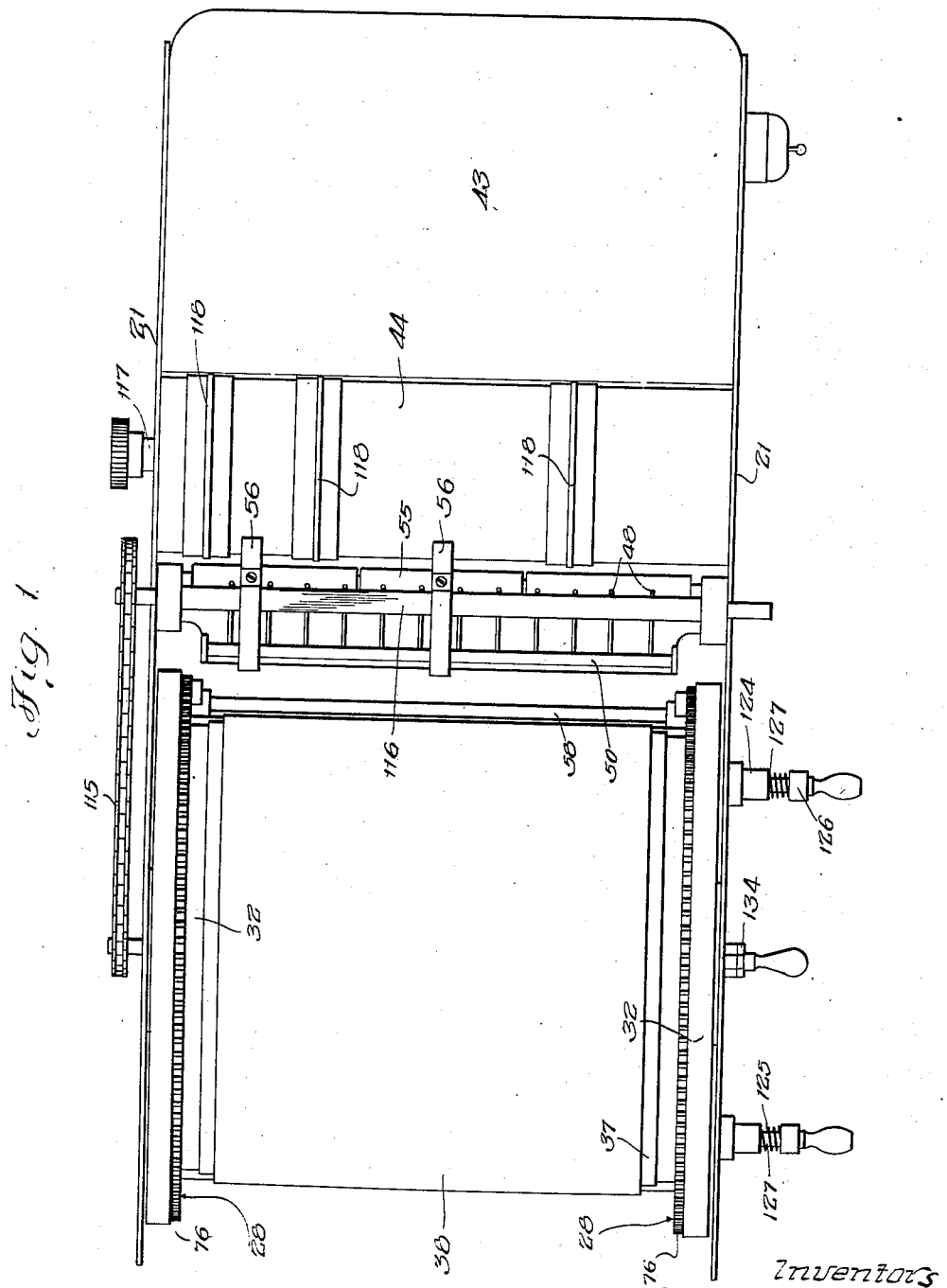
Figure 1 is a plan view of the machine.
Figure 2:
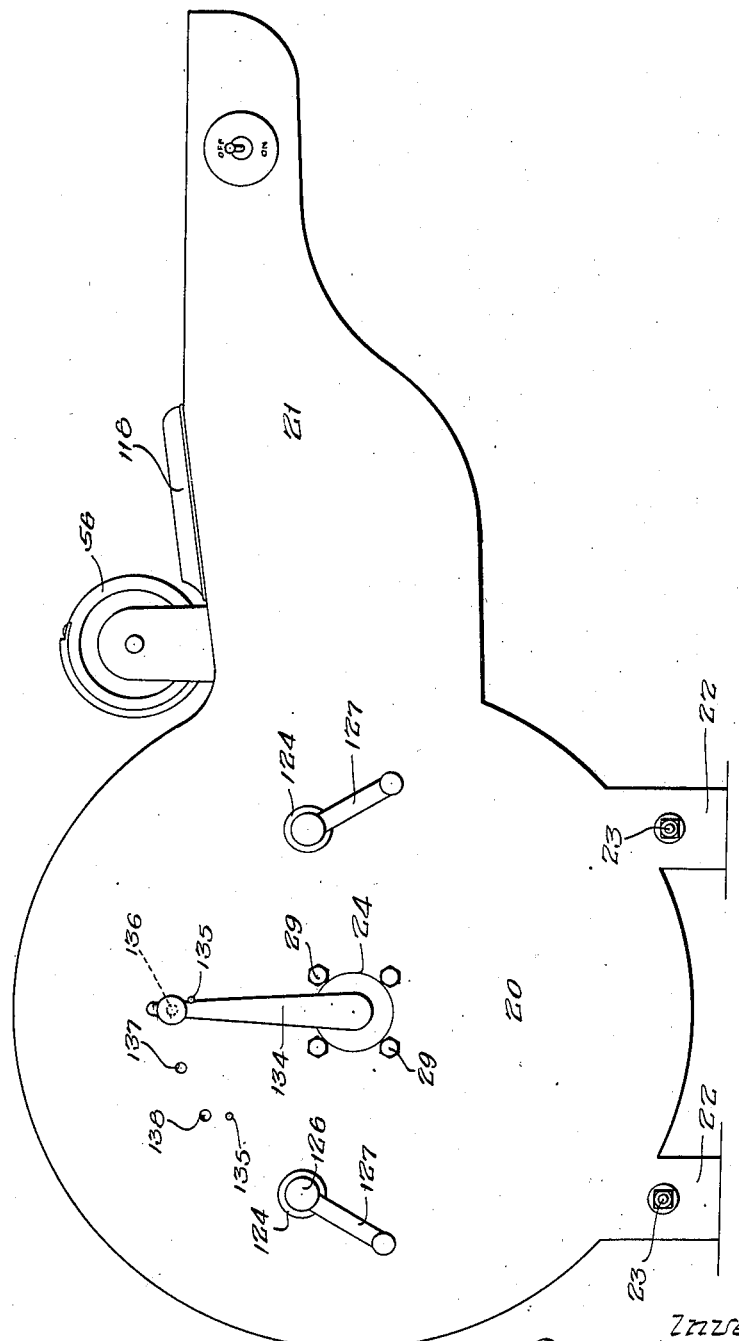
Fig. 2 is a left side view of the machine as viewed from the paper feeding position.
Figure 3:
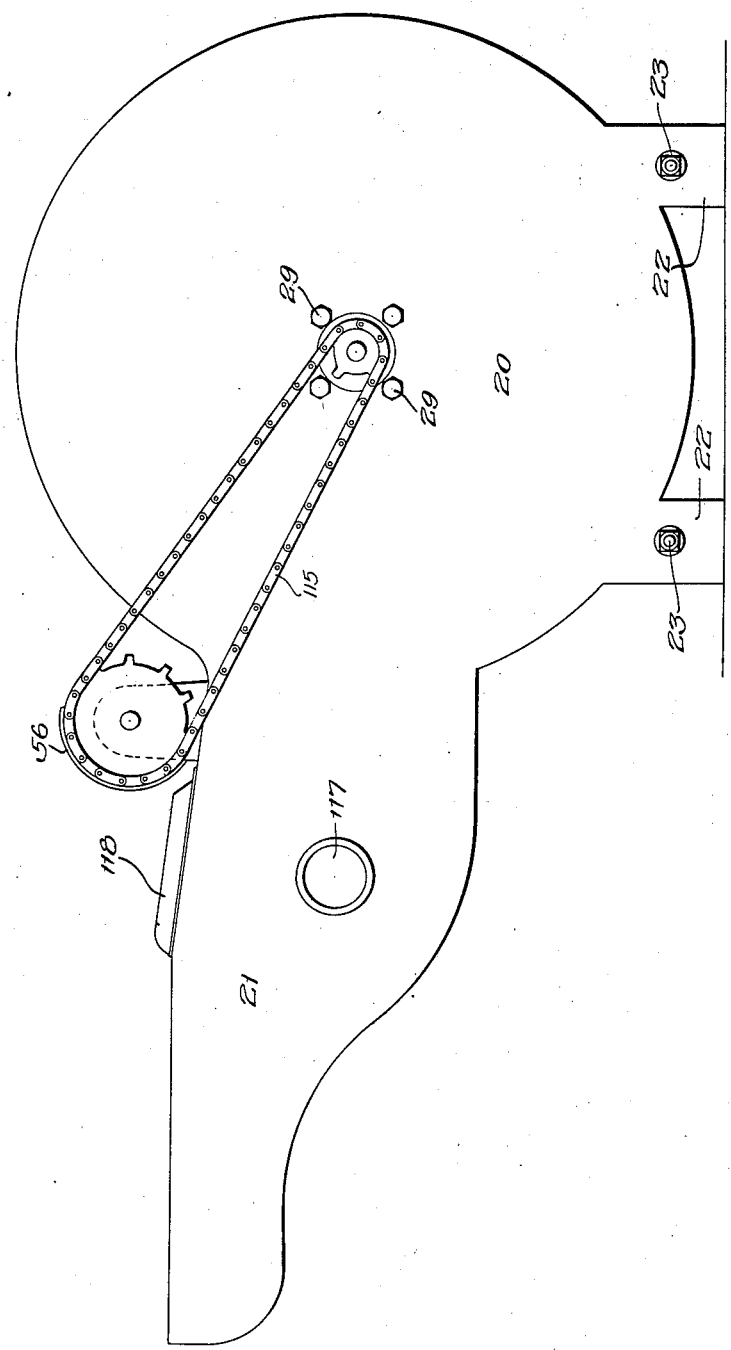
Fig. 3 is a right side view of the machine.
Figure 4:
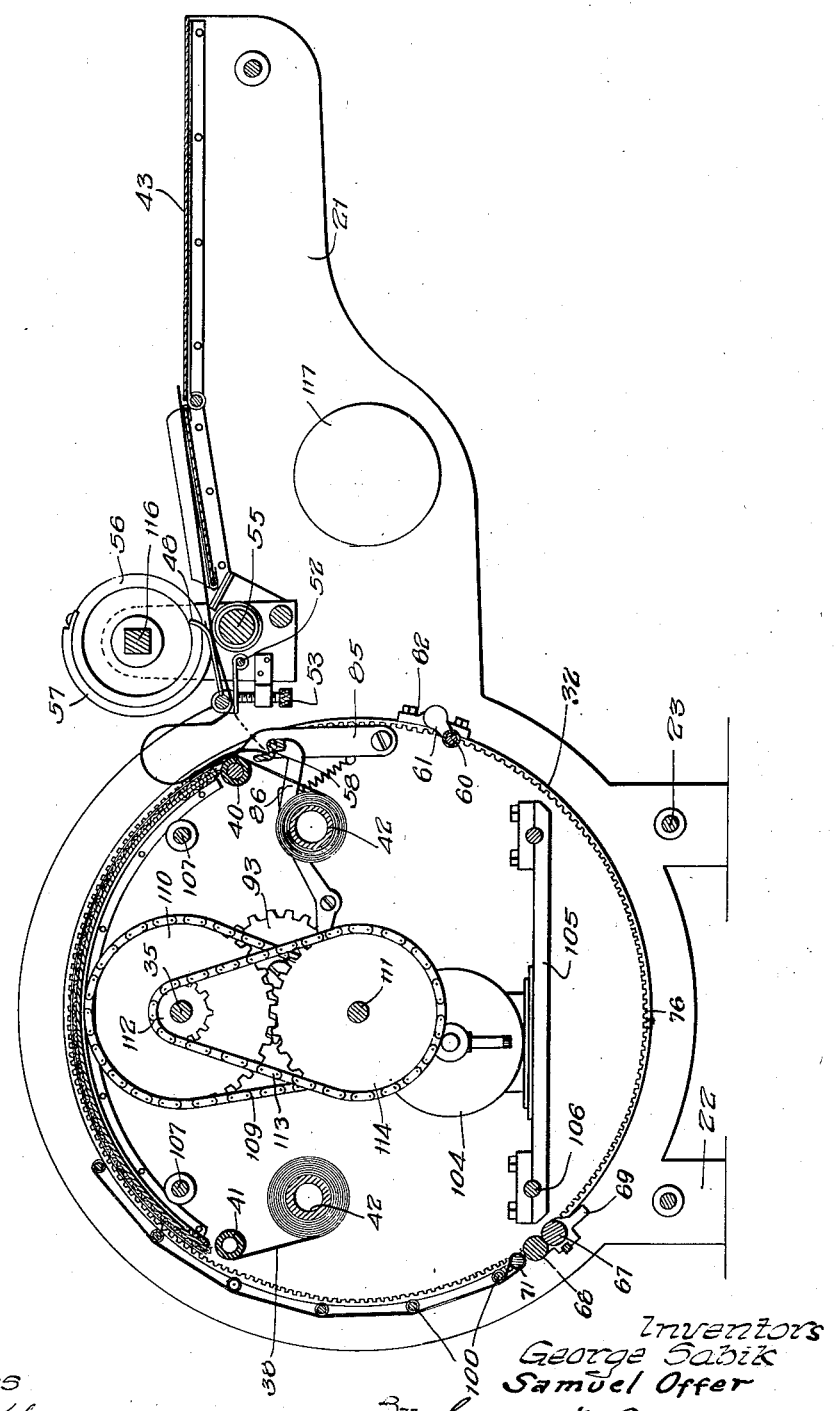
Fig. 4 is a longitudinal sectional view through the center of the machine.

The relation of these parts is such that after a sheet has been manually advanced to the feeding position, it will rest freely but without advancement upon the surface of the rotating lower roll 55 until the arrival of the rubber shoe of the feed wheel affords the necessary pressure to feed the sheet forwardly under the comb-shaped guide and under the rod 49, until its forward edge is brought into engagement with an angle shaped cross stop 58 having in its inner angle a groove or channel 59. At this point the direct forward advance of the sheet is arrested, but the rubber shoe on the feeding wheel will continue to maintain contact with the paper sheet, which thereupon is caused to loop forwardly and upwardly, as indicated in Fig. 4, thereby bringing the under surface of the looped paper into adherent contact with the gelatine band, which is sufficiently gummy or adhered to hold the paper in this looped condition until the arrival of a presser roller 60, which completes the withdrawal of the paper sheet from the stack and carries it forward evenly and smoothly over the gelatine surface until the sheet has been properly spread and compressed onto the gelatine surface by the rotary traverse of the presser roll.

It will be noted from Fig. 5 that as the paper sheet is looped upwardly by the thrust of the feeding wheel, the forward edge of the paper will slip into the groove 59 in the cross stop 58, so that, as the paper is looped upwardly, its edge will maintain engagement with the cross stop, and while the under surface of the paper is being brought into adherent contact with the gelatine, thereby preserving accurate registration of each of the paper sheets during the initial portion of the paper spreading and compressing operation.

Figure 8:
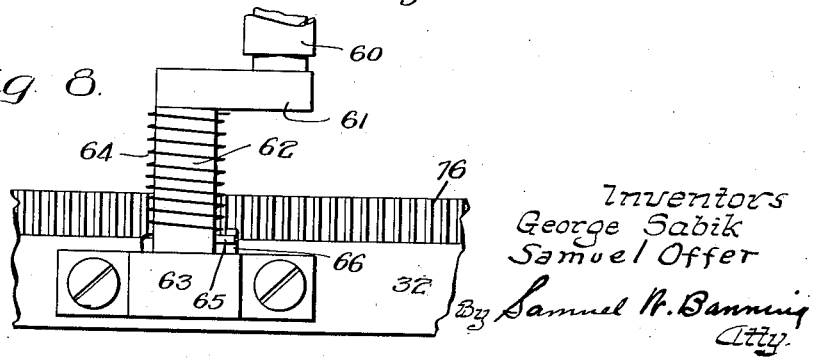
Fig. 8 is a detail of the presser roll.

The presser roll, as best shown in Fig. 8, is journalled at each end within an arm 61 outstanding from a pintle 62 which is journalled within a journal mounting 63 secured to the rim 32 of the rotary carrier. A spiral spring 64 which is wound around the pintle serves to impart inward pressure to the presser roll, and a stop pin 65 is adapted to engage with a stop 66 in limiting the movement of these parts, thereby affording means for maintaining the requisite spring pressure to hold the presser roll into firm contact with the gelatine spread onto the bed plate during the traverse of the pressure roll thereover.

The stripping mechanism will next be described: This mechanism is illustrated in detail in Figs. 11, 12 and 13. It consists of a forward roll 67 and a rear roll 68, both normally standing in slightly spaced relation to the gelatine surface. The rolls are carried between side brackets 69 each of which is provided at its rear end in its upper edge with a semi-circular groove 70 which bears upwardly against a cross rod 71, the ends of which are mounted within side blocks 72 on opposite sides of the machine and supported upon the rim of the carrier 32.

The rear roll 68 is mounted upon a shaft 73 the ends of which extend through the brackets 69, and the shaft at each end is provided with a spur gear 74 which meshes with a pinion 75, which pinion is of sufficient width to also mesh with gear teeth 76 formed on the edges of each of the inner circular side plates 28.

The forward roll 67 is carred by journals 77 which are mounted in sliding journal blocks 78 guided within slots 79 in the brackets 69, each of which brackets is provided with a bore 80 within which is located a spring 81 bearing against the associated journal block 78, which arrangement serves to hold the forward roll into compressive relation to the rear roll. The pressure of each spring may be adjusted by a screw plug 82.

Figure 7:
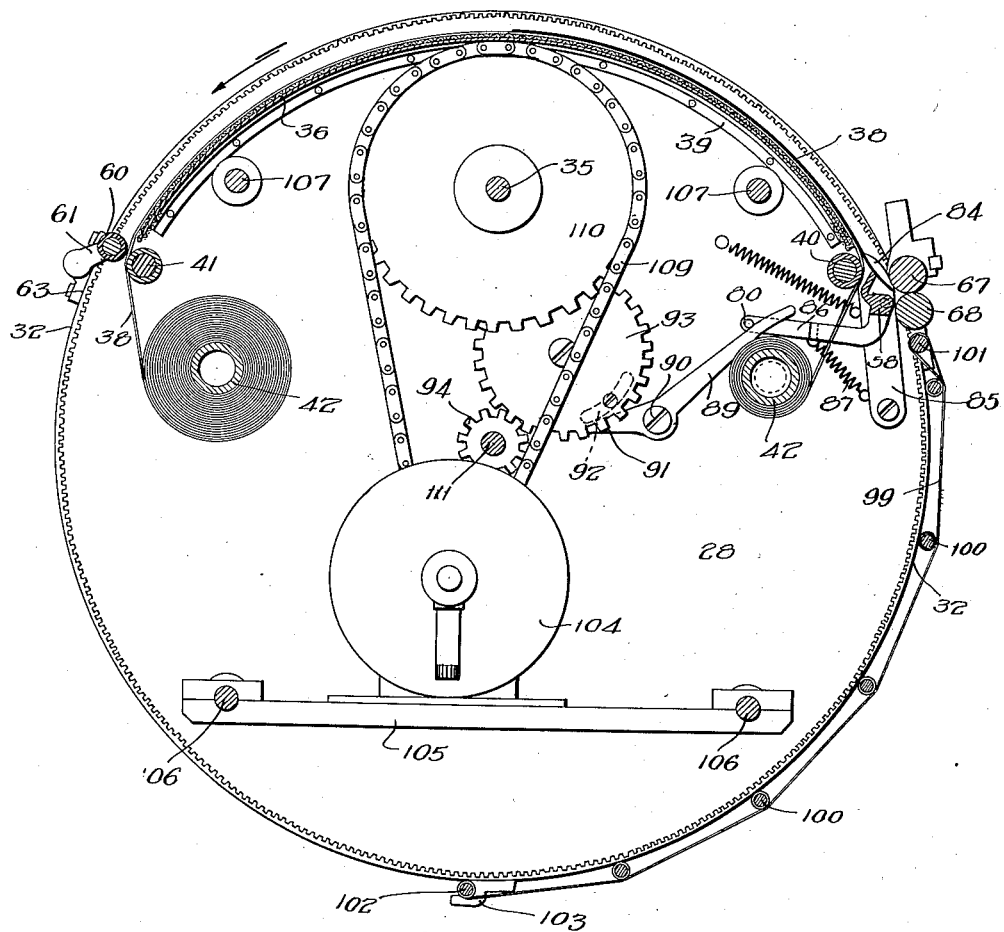
Fig. 7 is a cross sectional elevation showing the paper stop actuated to deliver the edge of a paper sheet to the stripper rolls.

In order to hold the brackets normally in contact with the rod 71, a leaf spring 83 is provided on each of the brackets 69, which leaf springs bear against the upper side of the rod 71 and normally hold the parts in the relation shown in Fig. 7. The arrangement, however, permits the entire stripping mechanism to be tilted into the position illustrated in Fig. 12, when each of the brackets encounters a cam 84, which cams are formed on the upper edges of the plates 85 secured respectively to the inner circular plates 28 in adjacent relation to the position occupied by the angle cross stop 58, which cross stop is pivoted between the plates 85.

The tilting of the stripper mechanism as it rides over the cams 84 serves to elevate the forward roll 67 slightly, so as to cause this roll to clear the edge of the paper sheet which is still engaged by the cross stop 58.

The cross stop is provided at each end with an inwardly extending arm 86 to which is secured a spring 87. Each arm is provided with an inward pin 88 which rests upon the upper surface of a lever 89, the levers being respectively pivoted by pins 90 to the inner circular plates 28.

Each of the levers 89 terminates in a short arm 91 which is adapted to be depressed by a cam 92 carried by a gear 93 which is driven from a center pinion 94. As each cam 92 engages the arm 91 of the lever 89 associated therewith, the outer end of the lever is lifted, which swings the arm 86 upwardly, thereby tilting the angle shaped cross stop 58 and causing its edge to swing outwardly, which elevates the rear edge of the paper sheet and presents it to the bite of the stripping rolls. The lifting of the forward roll 67 occurs concurrently with the tilting of the cross stop 58, so that the edge of the paper will be positively fed into the bite of the rolls as the stripper advances.

As soon as the stripper rides over the cams 84 the rolls will assume the normal position indicated in Fig. 11, and the stripping will proceed with the rolls in this position. Both of the rolls are positively driven by the provision of intermeshing gears 95 (see Fig. 13), which arrangement imparts rotation from the rear roll to the forward roll, while the intermeshing of the gears 74 and 75, in conjunction with the spring contact maintained by the grooves 70 with the rods 71 holds the stripper mechanism in proper relation to the bed plate with the gelatine surface mounted thereon.

The forward roll 67 is provided with grooves 96 which receive the tips of reversely bent guide fingers 97 projecting rearwardly from a cross bar 98 supported at each end upon the proximate bracket 69. The configuration of the fingers is such as to afford a space above the surface of the rear roll 68 for the discharge of the paper sheets, which are fed backwardly upon a receiving rack comprised of strips 99 of elastic fabric, which pass over cross bars 100, the ends of which rest freely upon the rim of the carrier 32. The forward ends of the elastic strips are looped around a forward rod 101 which is secured to the carrier, while the rear ends of the elastic strips are secured to a rear rod 102, the ends of which are engaged by hooks 103 on the carrier.

This arrangement permits the receiving rack to be stretched sufficiently to hook the ends of the rod 102 in under the hooks 103 with the intermediate cross rods 100 resting freely upon the edges of the carrier, so that the receiving rack will travel directly behind the stripper rolls and in position to receive the separated sheets of paper as they are fed upwardly and backwardly by the strippers and to carry them around to the point of delivery.

As shown, power is imparted from a motor 104 which is mounted upon a base 105 supported between lower tie rods 106, which together with upper tie rods 107 serve to properly space the inner side plates 28. The motor shaft is provided with a sprocket 108 which through a sprocket chain 109 imparts rotation to a sprocket wheel 110 mounted on the shaft 35.

Rotation is imparted from the shaft 35 to a center shaft 111 through the sprocket 112, sprocket chain 113 and a sprocket 114.

Rotation is imparted to the feed wheel 56 by means of a sprocket chain 115 which drives the shaft 116 on which the feed wheel is mounted. A rheostat 117 may be provided for regulating the speed of the motor.

Sheets of paper are fed between adjustable gage bars 118, and, as shown in Fig. 11, two feed wheels 56 are provided which are adjustable upon the squared shaft 116, so that separate paper sheets may be fed on opposite sides of the machine, but experience has shown that it is preferable to employ but a single feed wheel for each stack of paper sheets in order to secure precision in the feeding operation.

Figure 9:
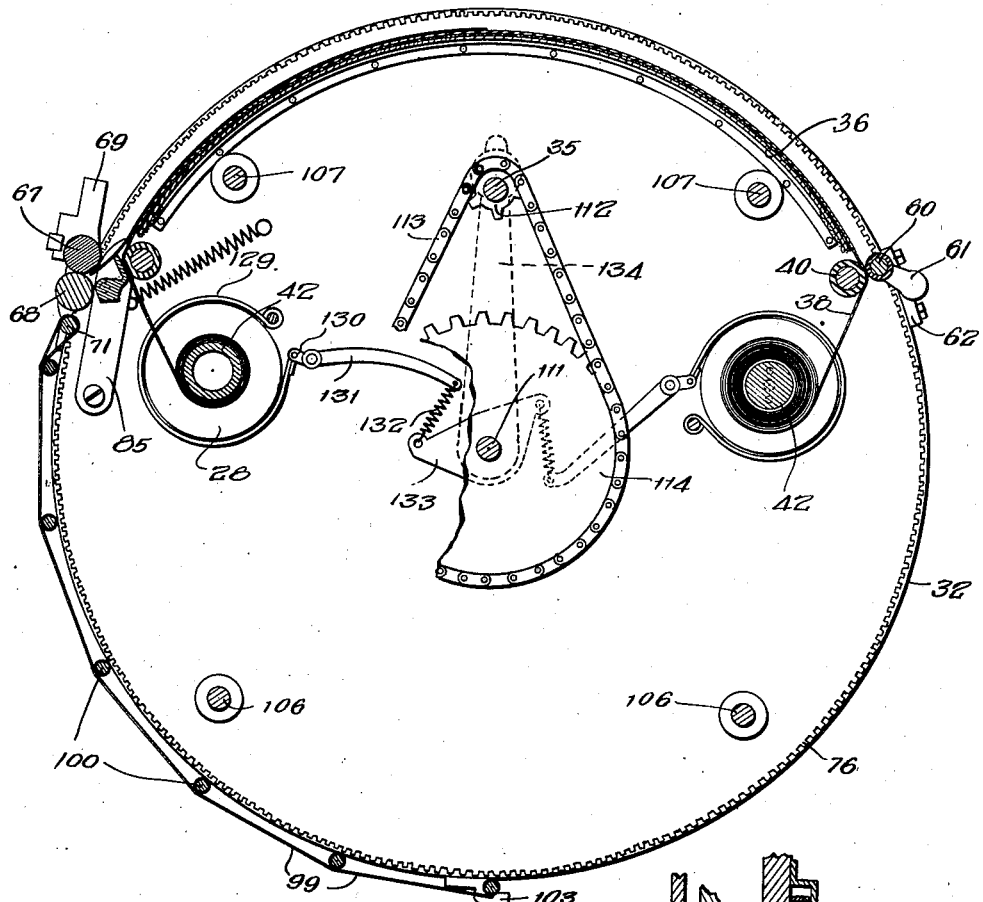
Fig. 9 is a sectional elevation showing the brake mechanism for the gelatine rolls.
Figure 10:
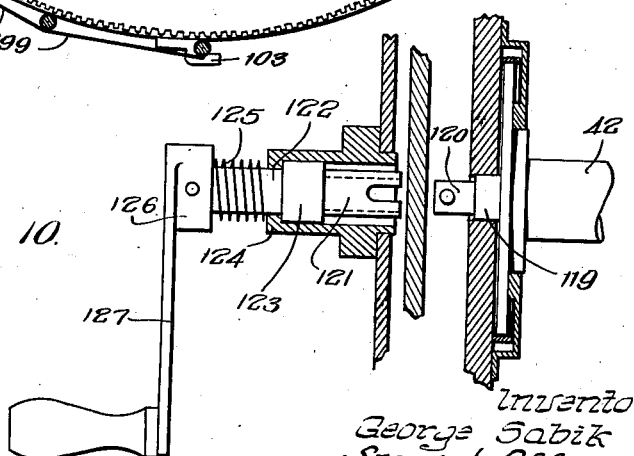
Fig. 10 is a sectional detail showing the chuck engaging mechanism for operating one of the gelatine roll spindles.

The gelatine band, as before stated, is wound on spindles 42, as best illustrated in Figs. 9 and 10, and in order to properly stretch the gelatine band around the curved surface of the bed plate, the following mechanism is provided:

Each of the spindles terminates at each end in a journal 119 provided with an outwardly extending chuck head 120 adapted to engage with a chuck 121 on the inner end of a winding shaft 122 provided with an enlarged collar 123 slidably mounted within a housing 124 and normally held in retracted position by the action of a spring 125 which bears against the head 126 of a handle 127, the arrangement being such as to permit the handle to be forced inwardly to bring the chuck into engaging relation with the chuck head when it is desired to wind the spindle.

Each of the spindles is provided with a brake drum 128 surrounded by a brake band 129, one end of which is secured to the short arm 130 of a lever 131, the inner end of which is engaged by a spring 132.

This arrangement is duplicated for each of the spindles, and each of the springs secured to a centrally disposed plate 133, one of the springs, however, being normally tight, while the other still remains slack. The arrangement is such that as the plate is rotated, a tightening or braking action will be imparted to one of the brake bands before the other, so that, by a limited movement, the first brake band will be tightened, while the second still remains released, additional movement, however, serving to tighten or set both of the brake bands.

The plate 133 is connected with a handle 134 on the outside of the machine, which handle is movable between stop pins 135 to any one of three positions, indicated as 136, 137 and 138.

With the handle standing in the first position, both of the brakes will be released and both of the spindles will be free to turn.

In winding the gelatine band, the handle 134 stands in the first position, which permits winding until the gelatine band has been drawn to the desired position, after which the handle 134 is shifted to the second position, which sets one of the brakes, thereby permitting the gelatine band to be drawn tight, after which both the brakes are set to hold the gelatine band in stretched condition.

*Operation*

In the operation of the machine, a stack of paper sheets are laid upon the feed table between the gage bars 118 which are spaced to closely align the paper sheets. The sheets are moved forwardly into abutting relation to the oblique rubber faced surface of the stop plate 45, and thereafter are fed one at a time into the space between the lower roll 55 and the prongs of the comb-like member 46.

It is unnecessary to exercise great care in manually positioning all of the sheets to the same distance, since the ultimate registering of the paper sheets is effected by the feed wheel in conjunction with the angle-shaped gage bar 58.

Rotation of the feed wheel at determined intervals brings the rubber shoe into contact with the advance sheet and feeds the same until it engages the gage bar, and thereafter continues the feeding thrust until the paper has been looped upwardly and brought into adhesive contact with the gelatine. By this scheme of operations, any irregularity in the manual advancing of the sheets will be fully compensated for, since each sheet will be stopped at the same point and looped forwardly by the thrust of the feed wheel before advancing presser roll arrives in position to engage the paper loop and carry the end of the sheet forwardly from the feed wheel and roll it out onto the surface of the gelatine. By properly timing these movement, the paper will always be under complete control, so that there will be no danger of skewing or wrinkling the paper.

The engagement of the forward edge of the paper sheet within the groove 59 occurs as soon as the paper begins to loop upwardly onto the thrust of the feed wheel, which serves to closely gage or align the paper sheets, and this continues until the gage 58 is tilted outwardly, which releases the edge of the paper and allows it to spring upwardly in position to enter the space between the stripper rolls, after which the stripping operation will continue until the paper is delivered onto the receiving rack and carried around to the discharging point.

The machine is of comparatively simple construction, and the circular formation of the bed plate and of the carrier permits the presser roll and stripper rolls to be firmly mounted and positively carried forward at a comparatively high rate of speed, and permits the printing operation to be carried out with neatness and accuracy.

Although the machine has been shown and described as being provided with a single presser roll and a single stripping device, it is obvious that multiple sets of these devices might be mounted upon the same rotary carrier, if made of sufficient circumferential dimensions to accommodate duplicate sets of mechanisms.

Although the invention has been described in complete detail, it is not the intention to limit the invention to the precise arrangement shown, since modifications thereof within the language of the claims are contemplated.

We claim:

1. In a duplicating machine, the combination of a frame provided with a circularly curved bed plate adapted to support a gelatine band, a rotating carrier having its axis of rotation concentric with the center of curvature of said bed plate, a presser member carried by said carrier and adapted to exert pressure upon a paper sheet when laid in contact with said gelatine band, and means for stripping the paper sheet from said gelatine band after printing, a paper feeding device and means for actuating the same at timed intervals prior to the arrival of the presser member, and a stop for receiving the forward edge of each paper sheet as fed and for holding the same during the traverse of the presser member, the parts being arranged to permit the presser member to engage the under side of the stopped paper sheet and draw the paper sheet forwardly and spread evenly over the surface of the gelatine band.

2. In a duplicating machine, the combination of a frame provided with a circularly curved bed plate adapted to support a gelatine band, a rotating carrier having its axis of rotation concentric with the center of curvature of said bed plate, a presser member carried by said carrier and adapted to exert pressure upon a paper sheet when laid in contact with said gelatine band, and a stripping device carried by said rotating carrier and mounted in position to follow the presser member and strip the paper sheet from the gelatine band after printing, a paper feeding device and means for actuating the same at timed intervals prior to the arrival of the presser member, and a stop for receiving the forward edges of each paper sheet as fed and for holding the same during the traverse of the presser member, the parts being arranged to permit the presser member to engage the under side of the paper sheet and draw the paper sheet forwardly and spread evenly over the surface of the gelatine band.

3. In a duplicating machine, the combination of a frame provided with a circularly curved bed plate adapted to support a gelatine band, a rotating carrier having its axis of rotation concentric with the center of curvature of said bed plate, a presser member carried by said carrier and adapted to exert pressure upon a paper sheet when laid in contact with said gelatine band, a pair of stripping rolls mounted upon said rotating carrier in position to follow the presser member, means for imparting positive rotation to said stripper rolls, a paper feeding device and means for actuating the same at timed intervals prior to the arrival of the presser member, and a stop for receiving the forward edge of each paper sheet as fed and for holding the same during the traverse of the presser member, and for presenting the edge of the paper sheet to the bite of said roll for stripping the sheet from the gelatine band after printing, the parts being arranged to permit the presser member to engage the under side of the stopped paper sheet and draw the paper sheet forwardly and spread it evenly over the surface of the gelatine band.

4. In a duplicating machine, the combination of a bed plate adapted to support a gelatine band, a movable presser member mounted to traverse the bed plate and exert pressure upon paper sheets spread upon the gelatine band, a stop device located in proximate relation to the feeding end of the gelatine band and adapted to receive and hold the end of a paper sheet in proximate relation to the surface of the gelatine band, feeding means for feeding paper sheets to the stop device in position to permit the paper sheet to be engaged by the presser plate along a line intermediate the feeding means and the forward edge of the paper sheet, and means for operating the feeding means and the presser member in such timed relation that each paper sheet will, after engagement by the stop device, be looped forwardly by the feeding means against the surface of the gelatine band before the arrival of the presser member.

5. In a duplicating machine, the combination of a bed plate adapted to support a gelatine band, a movable presser member mounted to traverse the bed plate and exert pressure upon paper sheets spread upon the gelatine band, a stop device located in proximate relation to the feeding end of the gelatine band and adapted to receive and hold the end of a paper sheet in proximate relation to the surface of the gelatine band, feeding means for feeding paper sheets to the stop device in position to permit the paper sheet engaged by the presser member along a line intermediate the feeding means and the forward edge of the paper sheet, and means for operating the feeding means and the presser member in such timed relation that each paper sheet will, after engagement by the stop device, be looped forwardly by the feeding device against the surface of the gelatine band before the arrival of the presser member, and a stripping device mounted to traverse the bed plate behind the presser member and to engage and strip the paper sheets after printing.

6. In a duplicating machine, the combination of a bed plate adapted to support a gelatine band, a movable presser member mounted to traverse the bed plate and exert pressure upon paper sheets spread upon the gelatine band, a stop device located in proximate relation to the feeding end of the gelatine band and adapted to receive and hold the end of a paper sheet in proximate relation to the surface of the gelatine band, feeding means for feeding paper sheets to the stop device in position to permit the paper sheet to be engaged by the presser member along a line intermediate the feeding means and the forward edge of the paper sheet, and means for operating the feeding means and the presser member in such timed relation that each paper sheet will, after engagement by the stop device, be looped forwardly by the feeding device against the surface of the gelatine band before the arrival of the presser member, and a stripping device mounted to traverse the bed plate behind the presser member and to engage and strip the paper sheets after printing, and means for elevating the stop device in advance of the arrival of the stripping device to present the edge of the paper sheet to the stripping device.

7. In a duplicating machine, the combination of a bed plate adapted to support a gelatine band, a movable presser member mounted to traverse the bed plate and exert pressure upon paper sheets spread upon the gelatine band, a stop device located in proximate relation to the feeding end of the gelatine band and adapted to receive and hold the end of a paper sheet in proximate relation to the surface of the gelatine band, feeding means for feeding paper sheets to the stop device in position to permit the paper sheet engaged by the presser member along a line intermediate the feeding means and the forward edge of the paper sheet, and means for operating the feeding means and the presser member in such timed relation that each paper sheet will, after engagement by the stop device, be looped forwardly by the feeding device against the surface of the gelatine band before the arrival of the presser member, and a stipping device mounted to traverse the bed plate behind the presser member and to engage and strip the paper sheets after printing, and a rack mounted to travel behind the stripping device in position to receive the paper sheets from the stripping device.

8. In a duplicating machine, the combination of a bed plate adapted to support a gelatine band, a movable presser member mounted to traverse the bed plate and exert pressure upon paper sheets spread upon the gelatine band, a stop device located in proximate relation to the feeding end of the gelatine band and adapted to receive and hold the end of a paper sheet in proximate relation to the surface of the gelatine band, feeding means for feeding paper sheets to the stop device in position to permit the paper sheet to be enaged by the presser member along a line intermediate the feeding means and the forward edge of the paper sheet, and means for operating the feeding means and the presser member in such timed relation that each paper sheet will, after engagement by the stop device, be looped forwardly by the feeding device against the surface of the gelatine band before the arrival of the presser member, and a stripping device mounted to traverse the bed plate behind the presser member and to engage and strip the paper sheets after printing, and means for elevating the stop device in advance of the arrival of the stripping device to present the edge of the paper sheet to the stripping device, and a rack mounted to travel behind the stripping device in position to receive paper sheets from the stripping device.

9. In a duplicating machine, the combination of a bed plate adapted to support a gelatine band, a presser roll mounted to traverse the bed plate and exert pressure upon paper sheets spread upon the gelatine band, an angle shaped stop device mounted in position to lie in adjacent relation to the rear edge of a gelatine strip carried by the bed plate, a feeding device including a roller having an interrupted feeding surface adapted to engage and feed forwardly a sheet of paper until the same contacts with the stop device and thereafter to continue the forward feeding of the paper sheet to cause the sheet to loop forwardly into adhesive contact with the gelatine band, and means for timing the operation of the presser member and the feeding device to effect said looping of the paper prior to the arrival of the presser member within the paper loop so formed.

10. In a duplicating machine, the combination of a bed plate adapted to support a gelatine band, a presser roll mounted to traverse the bed plate and exert pressure upon paper sheets spread upon the gelatine band, an angle shaped stop device mounted in position to lie in adjacent relation to the rear edge of a gelatine strip carried by the bed plate, a feeding device including a roller having an interrupted feeding surface adapted to engage and feed forwardly a sheet of paper until the same contacts with the stop device and thereafter to continue the forward feeding of the paper sheet to cause the sheet to loop forwardly into adhesive contact with the gelatine band, and means for timing the operation of the presser member and the feeding device to effect said looping of the paper prior to the arrival of the presser member within the paper loop so formed, a pair of power driven stripper rolls mounted to follow the presser member, and means for moving the stop device in advance of the arrival of the stripping rolls to present the edge of the paper to the bite of the rolls.

11. In a duplicating machine, the combination of a bed plate adapted to support a gelatine band, a presser roll mounted to traverse the bed plate and exert pressure upon paper sheets spread upon the gelatine band, an angle shaped stop device mounted in position to lie in adjacent relation to the rear edge of a gelatine strip carried by the bed plate, a feeding device including a roller having an interrupted feeding surface adapted to engage and feed forward a sheet of paper until the same contacts with the stop device and thereafter to continue the forward feeding of the paper sheet to cause the sheet to loop forwardly into adhesive contact with the gelatine band, and means for timing the operation of the presser member and the feeding device to effect said looping of the paper prior to the arrival of the presser member within the paper loop so formed, and a rack mounted to travel behind the stripping device in position to receive the paper sheets from the stripping device.

12. In a duplicating machine, the combination of a bed plate adapted to support a gelatine band, a presser roll mounted to traverse the bed plate and exert pressure upon paper sheets spread upon the gelatine band, an angle shaped stop device mounted in position to lie in adjacent relation to the rear edge of a gelatine strip carried by the bed plate, a feeding device including a roller having an interrupted feeding surface adapted to engage and feed forwardly a sheet of paper until the same contacts with the stop device and thereafter to continue the forward feeding of the paper sheet to cause the sheet to loop forwardly into adhesive contact with the gelatine band, and means for timing the operation of the presser member and the feeding device to effect said looping of the paper prior to the arrival of the presser member within the paper loop so formed, a pair of power driven stripper rolls mounted to follow the presser member, and means for moving the stop device in advance of the arrival of the stripping rolls to present the edge of the paper to the bite of the rolls, and a rack mounted to travel behind the stripping device in position to receive the paper sheets from the stripping device.

13. In a duplicating machine, a paper stop device adapted to be engaged by the edge of a paper sheet when fed forwardly, a stripper device comprising a pair of power driven rollers and mounted to traverse the position occupied by the stop device, and means for moving the stop device in advance of the arrival of the stripping rolls to elevate the edge of the paper sheet and present it to the bite of the rolls.

14. In a duplicating machine, the combination of a pivoted paper stop adapted when in normal position to receive and stop the edge of a sheet of paper, means for tilting the paper stop to elevate the engaged edge of the sheet of paper, and a stripper mounted to traverse the position occupied by the paper stop and receive the edge of the paper sheet when elevated by the tilting of the paper stop.

15. In a duplicating machine, the combination of a pivoted paper stop adapted when in normal position to receive and stop the edge of a sheet of paper, means for tilting the paper stop to elevate the engaged edge of the sheet of paper, and a stripper mounted to traverse the position occupied by the paper stop and receive the edge of the paper sheet when elevated by the tilting of the paper stop, said stripper including a pair of rollers and means for imparting rotation to one of the rollers by the traversing movement of the stripper and for imparting rotation to the second roller from the first roller.

16. In a duplicating machine, the combination of a frame provided with a bed plate adapted to support a gelatine band, a carrier adapted to traverse the bed plate, a presser member carried by said carrier and adapted to exert pressure upon a paper sheet when laid in contact with said gelatine band, a stripping device carried by said carrier mounted in position to follow the presser device and strip the paper sheet from the gelatine band after printing, a stop device located in proximate relation to the feeding end of the gelatine band and adapted to receive and hold the end of the paper sheet in proximate relation to the surface of the gelatine band, and means for elevating the stop device in advance of the arrival of the stripping device to present the stopped edge of a paper sheet to the stripping device.

17. In a duplicating machine, the combination of a frame provided with a bed plate adapted to support a gelatine band, a carrier mounted to traverse the bed plate, a presser member carried by said carrier and adapted to exert pressure upon a paper sheet when laid in contact with said gelatine band, and means carried by the carrier for stripping the paper sheet from said gelatine band after printing, a paper feeding device, and means for actuating the same at timed intervals prior to the arrival of the presser member, and a stop for receiving the forward edge of each paper sheet as fed and for holding the same during the traverse of the presser member, the parts being arranged to permit the presser member to engage the under side of the stopped paper sheet and draw the paper sheet forwardly and spread it evenly over the surface of the gelatine band.

18. In a duplicating machine, the combination of a frame provided with a bed plate adapted to support a gelatine band, a carrier mounted to traverse the bed plate, a presser member carried by said carrier and adapted to exert pressure upon a paper sheet when laid in contact with said gelatine band, and means carried by the carrier for stripping the paper sheet from said gelatine band after printing, a paper feeding device, and means for actuating the same at timed intervals prior to the arrival of the presser member, and a stop for receiving the forward edge of each paper sheet as fed and for holding the same during the traverse of the presser member, the parts being arranged to permit the presser member to engage the under side of the stopped paper sheet and draw the paper sheet forwardly and spread it evenly over the surface of the gelatine band, and means actuated by the movement of the carrier for elevating the stop device in advance of the arrival of the stripping means for presenting the stopped edge of the paper to the stripping means.

19. In a duplicating machine, the combination of a frame provided with a circularly curved bed plate adapted to support a gelatine band, a rotating carrier having its axis of rotation concentric with the center of curvature of said bed plate, a presser member carried by said carrier and adapted to exert pressure upon a paper sheet when laid in contact with said gelatine band, and means carried by the carrier for stripping the paper sheet from said gelatine band after printing, a paper guide adapted to direct the paper sheet toward the bed plate, a stop for receiving the forward edge of ea h sheet as fed and for holding the same during traverse of the presser member, and means actuated by the movement of the carrier for elevating the stop device to present the stopped edge of the paper sheet to the stripper means.

20. In a duplicating machine, the combination of a frame provided with a circularly curved bed plate adapted to support a gelatine band, a rotating carrier having its axis of rotation concentric with the center of curvature of said bed plate, a presser member carried by said carrier and adapted to exert pressure upon a paper sheet when laid in contact with said gelatine band, and means carried by the carrier for stripping the paper sheet from said gelatine band after printing, a paper guide adapted to direct the paper sheet toward the bed plate, a stop for receiving the forward edge of each sheet as fed and for holding the same during traverse of the presser member, the parts being arranged to permit the presser member to engage the under side of the stopped paper sheet and draw the paper sheet forwardly and spread it evenly over the surface of the gelatine band, and means actuated by the movement of the carrier for elevating the stop device to present the stopped edge of the paper sheet to the stripper means.

In witness that we claim the foregoing we have hereunto subscribed our names this 13th day of July, 1929.

GEORGE SABIK.
SAMUEL OFFER.